Figure 1:
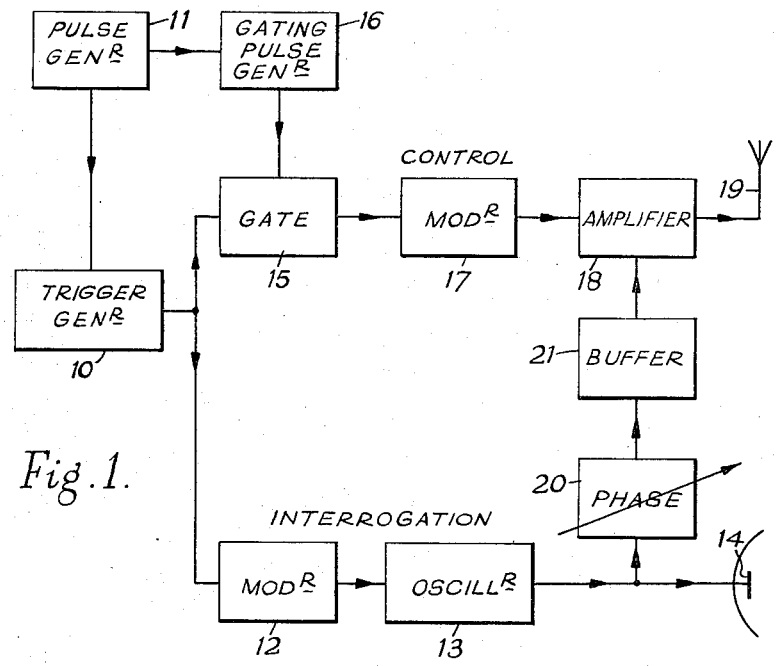

United States Patent Office 3,014,212
Patented Dec. 19, 1961

3,014,212
SECONDARY RADAR SYSTEMS
Leonard Perkins, Chiswick, London, England, assignor to A. C. Cossor Limited, London, England, a British company
Filed May 20, 1957, Ser. No. 660,383
Claims priority, application Great Britain May 25, 1956
6 Claims. (Cl. 343—6.5)

The present invention relates to secondary radar systems, that is to say systems in which a radio signal transmitted from a first station causes a transponder which may be remote from the first station to emit a radio response signal which is adapted to be received at the first station.

In a known system of this kind, such for example as that set forth in British Patent No. 734,588 and in U.S. Patent 2,824,301, the signal transmitted from the first station comprises recurrent pairs of pulses spaced apart in time, the second pulse of each pair being an interrogating pulse of radio frequency energy which is transmitted from a directional aerial and the first pulse of each pair being a control pulse of radio frequency energy having an amplitude greater than that of any side lobes but less than that of the main lobe of the transmission from the directional aerial, the control pulses being transmitted from an omni-directional aerial, or from an aerial which is, at least, substantially less directional than the directional aerial.

In such a system the maximum range at which the transponder responds is limited by the range within which the control pulse has the required effect. The present invention has for its principal object to increase the range of response.

According to the present invention, there is provided a transmitter for a secondary radar system having an interrogating aerial which is relatively highly directive, a control aerial of relatively low directional properties, means for generating a signal comprising recurrent pairs of pulses of radio frequency energy, means for applying the first pulse of each pair to the control aerial in greater amplitude than the second impulse, and means for applying both pulses to the interrogating aerial. The signal may in some cases comprise recurrent groups of pulses, each group including more than two pulses.

The field strength radiated from the interrogating aerial in the direction of the main lobe of the interrogating aerial at each interrogating pulse is arranged to be greater than the resultant field strength radiated in the same direction from the control and interrogating aerials during each control pulse, and the field strength radiated from the interrogating aerial in the directions of the side lobes of the interrogating aerial at each interrogating pulse is arranged to be less than the resultant field strength radiated in the same directions from the control and interrogating aerials during each control pulse.

The two pulses transmitted simultaneously by the control and interrogating aerials may be in a fixed phase relation which is chosen for optimum effect and is usually an in-phase, or a substantially in-phase relation. Alternatively the phase relation may be random.

Figure 2:
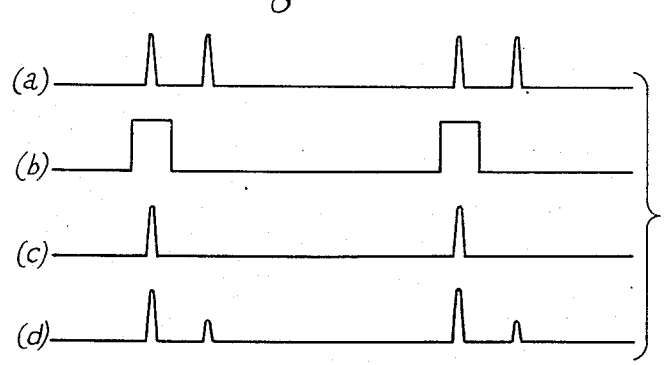
Figure 3:
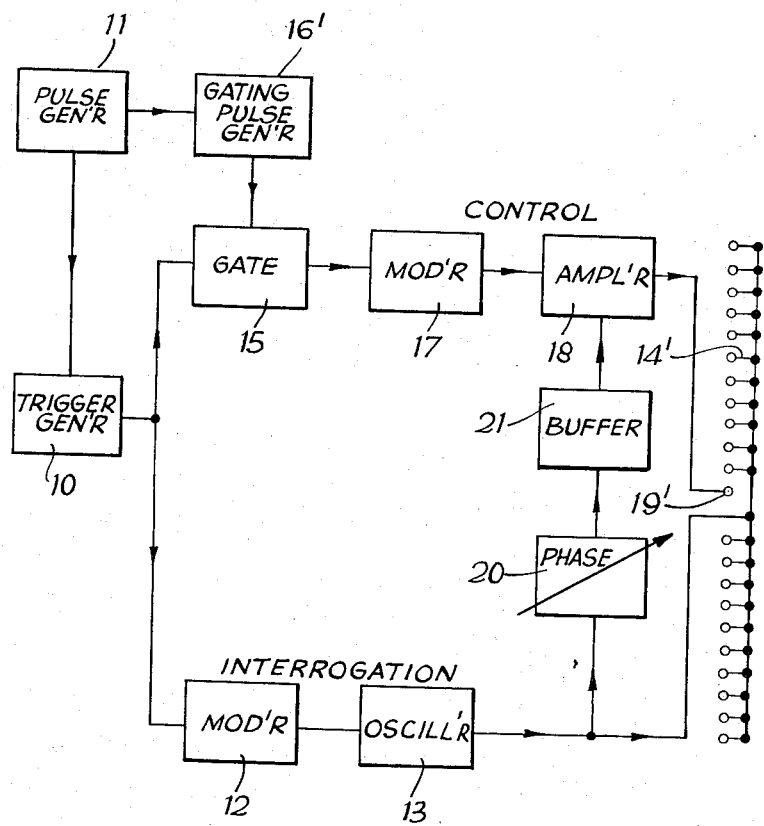

The invention will be described, by way of example, with reference to the accompanying drawing in which FIG. 1 is a block circuit diagram of one embodiment of the invention, and FIG. 2 shows idealised waveforms that may occur in the circuit of FIG. 1, and FIG. 3 shows a modification of the circuit of FIG. 1.

Referring to FIG. 1, a trigger pulse generator 10 controlled from a repetition frequency pulse generator 11 (which may be that of the secondary radar system or of an associated primary radar equipment) is arranged to generate recurrent pairs of pulses such as are indicated at (a) in FIG. 2. These pulses are applied to a modulator 12 which modulates an oscillator 13 feeding a directional interrogating aerial 14.

The pairs of pulses from 10 are also applied to a gate 15 controlled by gating pulses generated in a pulse generator 16 controlled by the master generator 11. The gating pulses from 16 may have the form shown in FIG. 2(b), and serve to pass through the gate 15 only the first pulse of each pair as shown in FIG. 2(c). This pulse is applied through a modulator 17 to an amplifier 18.

A part of the energy from the oscillator 13 is applied through a phase adjusting network 20 and a buffer stage 21 to the amplifier 18 where it is modulated by the signals from the modulator 17 and radiated from an omni-directional aerial 19. In this way by adjusting the network 20, an optimum phase relation between the oscillations radiated by the aerials 14 and 19 during the first pulse of each pair can be achieved. The polar diagram of the energy radiated at this time by the two aerials is in the form of a circle from which projects the main and side lobes of the directional transmission. The effective control pulse is thus greater than that due to the control aerial alone and is dependent upon the amount of energy transmitted and the phase relation between the two transmissions.

The second pulse of each pair, which is radiated from the interrogating aerial, has the normal polar diagram consisting of a main lobe and side lobes.

It is not essential that the phases of the oscillations from 13 and 18 should be locked as described. They may be random, in which case the elements 20 and 21 will be omitted and the amplifier 18 is replaced by an oscillator.

In a modification shown in FIG. 3 of the embodiment described with reference to FIG. 1, a common aerial structure is used for the control and interrogating aerials. This comprises an array of, say, twenty-one parallel equally spaced dipoles arranged in a plane. The centre dipole 19' constitutes the control aerial and the ten dipoles on either side of the central dipole constitute the interrogating aerial 14'.

In FIG. 3 the parts having the same structure as in FIG. 1 are given the same reference characters. The directional aerial 14' is fed in the same way as has already been described but the gating device 15, instead of suppressing entirely the second pulse of each pair, allows a part of each second pulse to past, as indicated in FIG. 2(d). This may be achieved by providing for the normal transmission of both pulses through gate 15 at a reduced amplitude, and the amplitude of the first pulse will be increased by the action of the single gating pulse from generator 16'. In this way a suitable small amount of energy is fed to the centre dipole 19' during the interrogating pulse. In this way a reduced side lobe pattern can be obtained from the interrogating aerial.

I claim:

1. A transmitter for a secondary radar system having an interrogating aerial which is relatively highly directive, a control aerial of relatively low directional properties, means for generating a signal comprising recurrent pairs of time-spaced pulses of radio frequency energy, the time interval between the pulses of each pair being relatively small with respect to the interval between pulse pairs, means for applying the first pulse of each pair for simultaneous radiation from both aerials to produce a polar radiation pattern formed of a circle having the main and side lobes of the directional radiation projecting therefrom, and means for applying the second pulse of each pair of pulses to the interrogating aerial to produce a polar radiation pattern in which the radiation in the main lobe is of intensity greater than that in the main lobe of the first-named radiation pattern and in which the radiation in the side lobes is of intensity less than that in the side lobes of the first-named radiation pattern.

2. A transmitter according to claim 1, comprising means for locking frequency and phase of the pulses applied simultaneously to the control and interrogating aerials.

3. A transmitter according to claim 1 wherein said means for applying the first pulse of each pair to the control aerial includes means for suppressing the application of the second pulse to the control aerial.

4. A transmitter according to claim 1 wherein said means for applying the first pulse of each pair to the control aerial includes means for applying the second pulse of each pair to the control aerial in an amplitude relatively small with respect to the amplitude of the first pulse.

5. A transmitter for a secondary radar system comprising a plurality of parallel dipoles spaced apart along a common axis, a majority of said dipoles constituting a unidirectional interrogating aerial and the remainder of said dipoles constituting an omni-directional control aerial, means for generating a signal comprising recurrent pairs of time-spaced pulses of radio frequency energy, the time interval between the pulses of each pair being relatively small with respect to the interval between pulse pairs, means for applying the first pulse only of each pair for simultaneous radiation from both aerials to produce a polar radiation pattern formed of a circle having the main and side lobes of the directional radiation projecting therefrom, and means for applying the second pulse of each pair of pulses to the interrogating aerial to produce a polar radiation pattern in which the radiation in the main lobe is of intensity greater than that in the main lobe of the first-named radiation pattern and in which the radiation in the side lobes is of intensity less than that in the side lobes of the first-named radiation pattern.

6. A transmitter for a secondary radar system comprising a plurality of parallel dipoles spaced apart along a common axis, a majority of said dipoles constituting a directional interrogating aerial and the remainder of said dipoles constituting an omni-directional control aerial, means for generating a signal comprising recurrent pairs of time-spaced pulses of radio frequency energy, the time interval between the pulses of each pair being relatively small with respect to the interval between pulse pairs, means for applying the first pulse of each pair for simultaneous radiation from both aerials to produce a polar radiation pattern formed of an approximate circle having the main and side lobes of the directional radiation projecting therefrom, and means for applying the second pulse of each pair for simultaneous radiation from both aerials to produce a polar radiation pattern in which the radiation in the main lobe is of intensity greater than that in said main lobe of the first-named radiation pattern, and in which the radiation in the directions of the side lobes is less than that in the corresponding directions in the first-named radiation pattern, the energy radiated from the control aerial during the second pulse of each pair being smaller than that radiated from the control aerial during the first pulse of each pair.

References Cited in the file of this patent

UNITED STATES PATENTS

| | | |
|---|---|---|
| 2,156,653 | Ilberg | May 2, 1939 |
| 2,324,548 | Wheeler | July 20, 1943 |
| 2,421,032 | Marchand | May 27, 1947 |
| 2,476,337 | Varian | July 19, 1949 |
| 2,824,301 | Levell et al. | Feb. 18, 1958 |